March 7, 1967 L. W. THIES, JR., ET AL 3,307,555
RELEASE CONTROL MEANS FOR A RANDOM-ACCESS STORAGE SYSTEM
Filed April 16, 1964

Inventors.
Louis W. Thies, Jr.
Richard G. Fisher
William W. DeVore
Joerg E. Schnoor By: *Louis A. Klyne*
*John T. Mathas*
*Dominick Nardelli*
Their Attorneys.

March 7, 1967 L. W. THIES, JR., ET AL 3,307,555
RELEASE CONTROL MEANS FOR A RANDOM-ACCESS STORAGE SYSTEM
Filed April 16, 1964 6 Sheets-Sheet 2

Inventors.
Louis W. Thies, Jr.
Richard G. Fisher
William W. DeVore
Joerg E. Schnoor By:

Their Attorneys

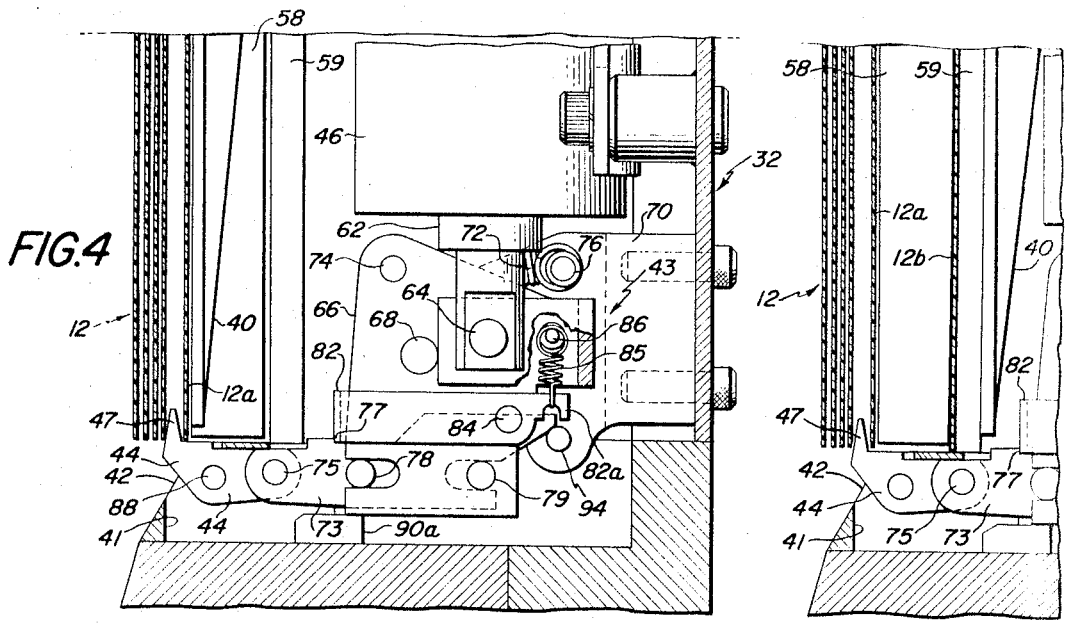
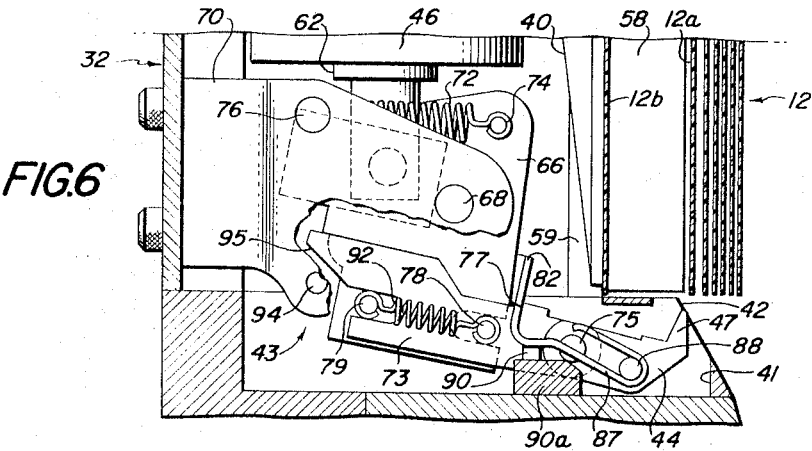
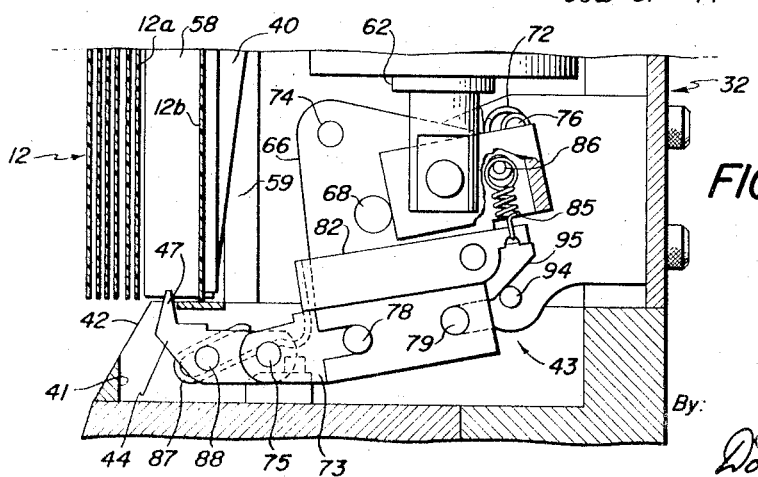

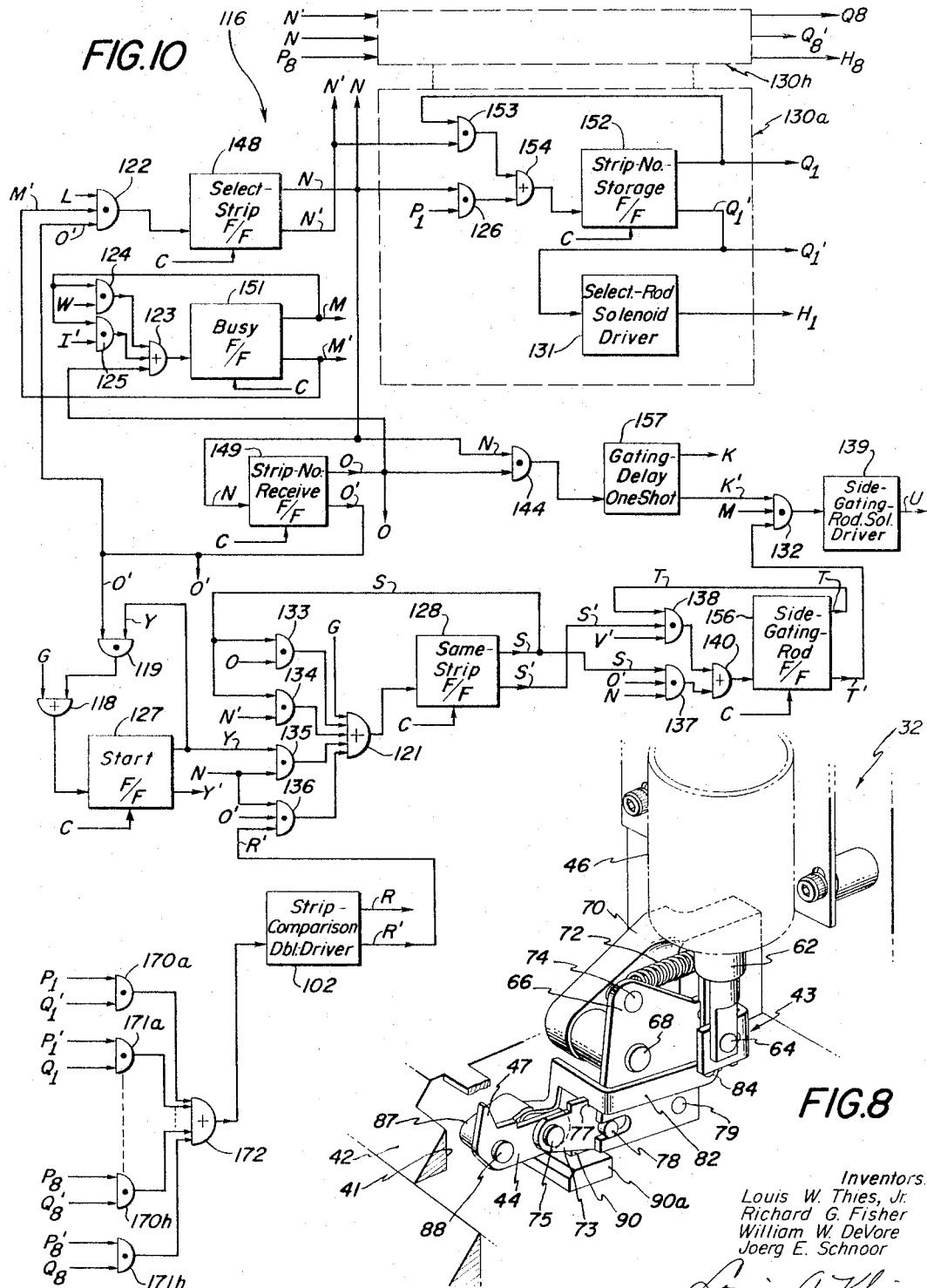

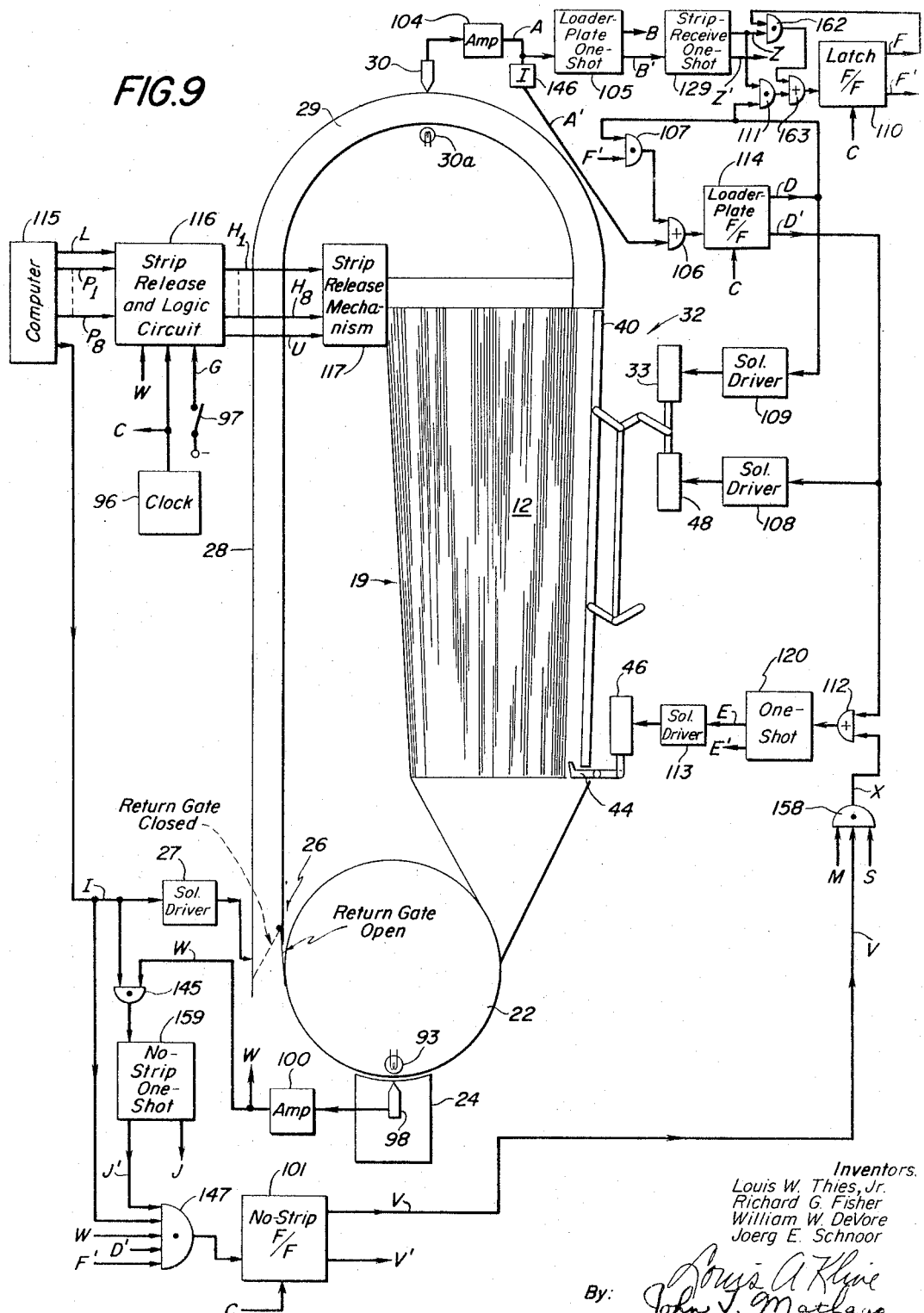

United States Patent Office 3,307,555
Patented Mar. 7, 1967

3,307,555
RELEASE CONTROL MEANS FOR A RANDOM-ACCESS STORAGE SYSTEM
Louis W. Thies, Jr., Palos Verdes Estates, Richard G. Fisher, Torrance, William W. De Vore, Palos Verdes Estates, and Joerg E. Schnoor, Rolling Hills, Calif., assignors to The National Cash Register Company, Dayton, Ohio, a corporation of Maryland
Filed Apr. 16, 1964, Ser. No. 360,196
15 Claims. (Cl. 129—16.1)

This invention relates generally to random-access storage systems containing a group of flexible storage strips and, more particularly, to improved means for releasing selected strips from a magazine means.

A random-access storage system of the prior art is disclosed in copending United States patent application, Serial No. 316,106, filed on October 14, 1963, inventors Peter S. Glaser et al. and assigned to the same assignee as this application. In the system described, information is magnetically recorded on strips of flexible magnetic material. Each strip is provided with retaining tabs formed at the upper end thereof by which the strips depend from suitable suspender means forming a part of a strip storage magazine. One strip at a time is selectively released from the lower end of the magazine, and the released strip freely drops through a chamber toward a rotating capstan. As the leading edge of the strip approaches the capstan, vacuum produced through perforations in the capstan draws the strip thereto, so that the strip is accelerated and passed by the capstan through a region provided with "reading" and "writing" transducer means. The capstan also imparts sufficient momentum to the strip to cause the strip to follow an upward path through an appropriate guideway back to the magazine. It should be noted that the guideway guides the strip up over the magazine and then down into a magazine loading means which loads the strip into one end of the magazine and back onto the suspender means.

One system, as described in the above mentioned application, is able to store close to 60 million bits on 256 strips (size 14 inches by 3¼ inches) with each strip having over 200 thousand bits. Since any desired strip may be selectively released from the magazine, dropped, accelerated to an operating speed, operated on, returned to the loading means, and loaded within a fraction of one second, rapid access is available to any one of the information groups containing more than 200 thousand bits, as represented by one strip. One characteristic of the system is that not only is the access time to any one of the strips very short, but, in general, the access time is relatively the same for any of the strips, irrespective of its location in the magazine. A desirable feature of the system is that one strip can be dropping to the capstan at the same time another strip is returning to the loading means, thereby speeding up the operation of the system.

Since a strip may be returning to the loading means while another is dropping from the magazine, there is a probability that the strip selected to be dropped is located adjacent the loading means. If this is so, the strip returning to the loading means might collide with the dropping strip. The strips might collide because the slowly dropping strip being at the end of the stack in the magazine is unrestrained. Then, as the loading plate rapidly moves out to receive an entering strip, due to the pressure distribution, the unrestrained dropping strip tends to move out with the plate and hence the dropping strip collides or, at least, interferes with the strip that is rapidly entering the loading means. The entering strip thus loses its momentum and fails to fully enter the magazine as required for loading. Up to now, the responsibility of preventing this type of failure has been placed upon the operator of the system. The operator has had to provide a suitable program routine for the computer utilizing the random-access system, which routine would insure that a strip would never be dropped when it is located next to the loading means. This method not only places the burden of preventing such strip dropping failures on the programmer, but also uses an excessive amount of computer memory space for programming which could otherwise be used for storage of more useful information.

Accordingly, it is a broad object of this invention to provide novel improvements for a strip random-access storage system.

Another object of this invention is to provide improved strip-release control means for a strip random-access system.

A more specific object of this invention is to provide an improved strip random-access storage system which completely obviates the possibility of collision between a dropped strip nearest the loading means and a strip returning to the loading means, without burdening the programmer, and without interfering with the normal speed of operation of the system when any other strip is dropped besides the strip positioned next to the loading means.

A further object of the invention is to provide improvements in the strip releasing means of the strip random-access system disclosed in the aforementioned copending patent application.

Still another object of the invention is to provide means for achieving the foregoing objects with a minimum of required structure and circuitry, while significantly increasing system reliability.

The manner in which the above objects may be accomplished will be illustrated herein as applied to a random-access storage system of the type disclosed in the aforementioned copending patent application having a magazine containing a group of strips. In such a system, any one of the strips can be selectively released and dropped from the bottom of the magazine, irrespective of its position therein. The dropped strip is, after it is operated on, engaged by a capstan for one or more rotations thereon during which one or more transducing operations can be performed before the strip is released, and guided by a guideway into the top of a loading means which reloads the strip into one end of the magazine. The random-access system also has a position sensing means to sense the position of a strip within the guideway as an aid in controlling the reloading of the strip back into the magazine.

It will, of course, be understood that the present invention is not limited to use with the system of the aforementioned patent application, but may be incorporated in any system where the features obtainable therefrom may be employed to advantage.

As pointed out previously, such a random-access system as disclosed in the aforementioned patent application has the disadvantage that when the selected strip to be released is the one nearest the loading means, there is the possibility that a strip may be returning to the loading means at the same time that the strip nearest the loading means is dropping, in which case a collision between the two may occur. Although this possibility may not occur often, it is important from the viewpoint of system reliability that it be avoided in some manner. As also pointed out previously, this burden of avoiding collision may be shifted to the programmer, but a much more desirable approach is the one employed in accordance with the present invention in which logical circuitry is provided in combination with retaining means for controlling the dropping of the strip nearest the loading means independently of other strips in the magazine, and also for controlling when the next selection can occur after the strip nearest the loading means has been selected. This control is made dependent upon the location of previously released strips in the system, as well as upon the immediate previous history of strip selection by the computer, whereby any possibility of collision is prevented from occurring between a strip returning to the loading means and a strip dropping from a position nearest the loading means.

Other objects, advantages, and features of the present invention, as well as other uses therefor, will become apparent from a consideration of the following description of a typical embodiment of the invention when taken in conjunction with the appended claims and the drawings wherein like characters designate like elements throughout the figures of the drawings:

FIG. 1 is an overall pictorial view of a random-access storage system in which the present invention may be incorporated;

FIG. 2 is a pictorial view showing how a typical information storage strip in the random-access storage system of FIG. 1 depends by its tabs from suitable selector rods, with the selector rods being shown in an unselected position with respect to the strip illustrated, and also how two side gating rods which support all strips in the same manner engage notches provided in the sides of the illustrated strip;

FIG. 4 is an enlarged elevation showing details of the retaining element, solenoid, and linkage means as may be incorporated in the random-access storage system of FIG. 1, the loader plate being shown moved in next to the group of information-storage strips;

FIG. 5 is a view of the left portion of the retaining element shown in FIG. 4 with the loader plate retracted away from the group of information-storage strips, and showing an information-storage strip in the loading means ready to be loaded;

FIG. 6 is an enlarged rear elevation of the retaining element, solenoid, and linkage means of FIG. 4 shown almost at the end of the energizing portion of the solenoid cycle;

FIG. 7 is a front elevation of the retaining element, solenoid, and linkage means of FIG. 4 shown at the end of the energizing portion of the solenoid cycle;

FIG. 8 is a pictorial view of the retaining element, solenoid, and linkage means shown in FIGS. 4, 5, 6, and 7;

FIG. 9 is a combination mechanical and electronic schematic diagram of a random-access system of the type illustrated in FIG. 1, showing how the present invention may be incorporated therein;

FIG. 10 is a schematic diagram of the strip release and logic circuit shown in block form in the random-access system of FIG. 9.

Figure 1:
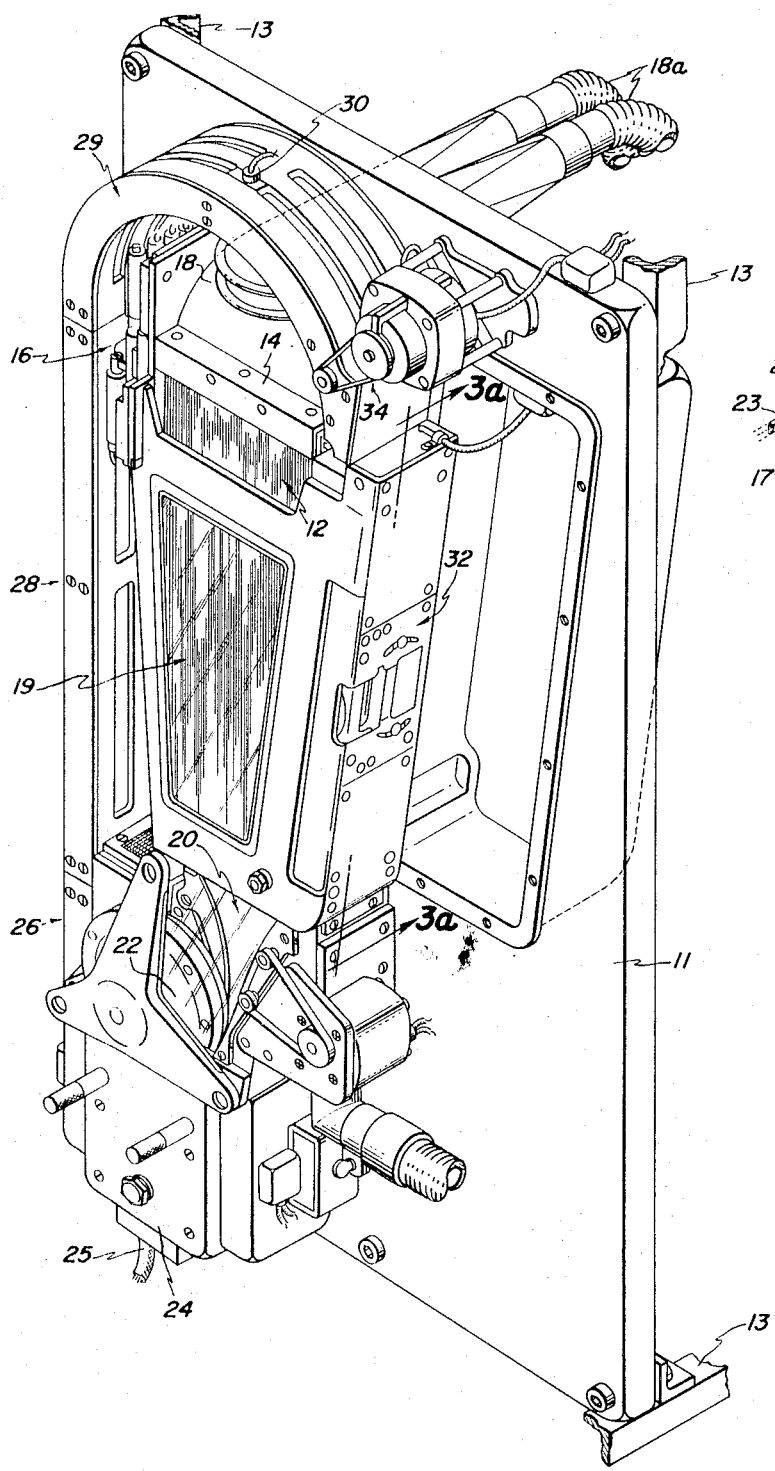
Figure 2:
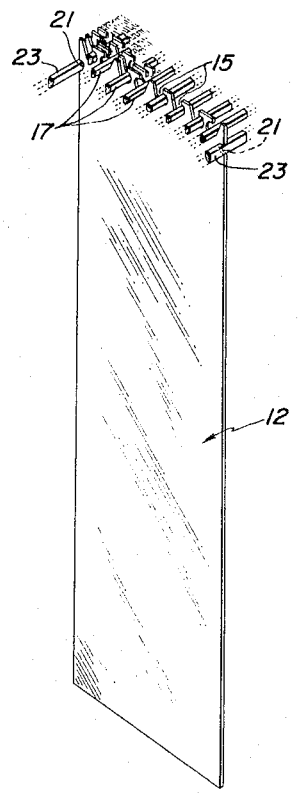

Referring to the drawings and to FIGS. 1 and 2, a brief description of the basic random-access system, as disclosed in the above-mentioned application follows. The mechanical components of the system are shown assembled on an upright back plate 11. The upright plate 11 is suitably mounted on a frame 13 which is partially shown. The frame 13 is part of an enclosed console (not shown) that may also enclose suitable pneumatic means and an electronic circuit for the system. The electronic circuit provides the signals to the solenoids that actuate the mechanical components of the system. The signals to the solenoids are fed through suitable wiring that is disposed on the back side of the upright plate 11.

The random-access system provides for storing information on strips 12 (FIG. 2) in the form of magnetic recordings. The strips 12 are flat, flexible and relatively long in relation to their width and are made, for example, of a flexible polyester such as "Mylar" (a trademark product of E. I. du Pont de Nemours and Company) coated with a thin layer of iron oxide. The strips 12 are disposed to depend lengthwise by their tabs 15 (formed at the upper edge) from suspender means 14 (FIG. 1) that is fixed to the upright plate 11. The suspender means 14 comprises, for example, eight horizontally disposed selector rods 17 (FIG. 2) and two side gating rods 23. The eight selector rods 17 engage the tabs 15 and the two gating rods 23 engage suitable notches 21 provided at opposite sides of each strip. The strips 12 can be selectively released one at a time by rotating certain ones of the selector rods 17 and afterwards the two gating rods 23. The selector rods and two gating rods are rotated by a solenoid means 16 (FIG. 1) that includes a solenoid and linkage for rotating each selector rod 17 and each gating rod 23. The solenoids in the solenoid means 16 are actuated by selective signals supplied by the electronic circuit.

Above the suspender means 14 is an air supply hood 18 (FIG. 1) which directs a stream of air down through the depending strips 12. The hood 18 is shaped to protrude through the back plate 11 and is connected to suitable air blowers (now shown) by two flexible hoses 18a. The air maintains the strips in spaced-apart relationship within a magazine 19 so that, when a strip is released from the magazine, the released strip can fall freely into a chamber 20. The chamber 20 is shaped so that any released strip has its lower edge guided toward the periphery of a rapidly rotating capstan 22. The strip is attracted to the capstan 22 by a vacuum produced through suitable radially disposed perforations (not shown) formed in the cylindrical wall of the capstan. This causes the capstan 22 to accelerate the strip to operating speed. The strip, now being under the influence of the capstan 22, is passed across a transducer means 24 that has "read" and "write" magnetic heads located at the upper end thereof, adjacent the capstan 22. The write and read signals are coupled to and from the transducer means 24 through a suitable wire cable 25. When the transducer means 24 has completed the write-read operation on the strip, a gate means 26 (shown schematically in FIG. 9) is opened by a suitable gate-open signal I, applied to a gate-solenoid driver circuit 27. The strip, due to centrifugal force, leaves the capstan 22 and enters a vertical guideway 28 to return to the magazine 19. The strip is guided upward by the vertical guideway 28 into an arcuate guideway 29. Within the arcuate guideway 29 the strip interrupts light from a lamp 30a (FIG. 9) shining on a photocell 30. When the light is interrupted, a signal is produced by suitable means which signals a loading means 32 to prepare for a returning strip. A strip-control roller assembly 34 (FIG. 1) is located within the arcuate guideway 29 and imparts a relatively fixed speed to the strip as it enters the loading means 32. This ensures that the strip enters the loading means 32 within a given length of time. After the strip enters the loading means, a strip loading operation (to be described hereinafter) is performed in response to a delayed signal, which, in turn, is produced in response to the light again shining on photocell 30, after the trailing edge of the strip passes the photocell.

Figure 3A:
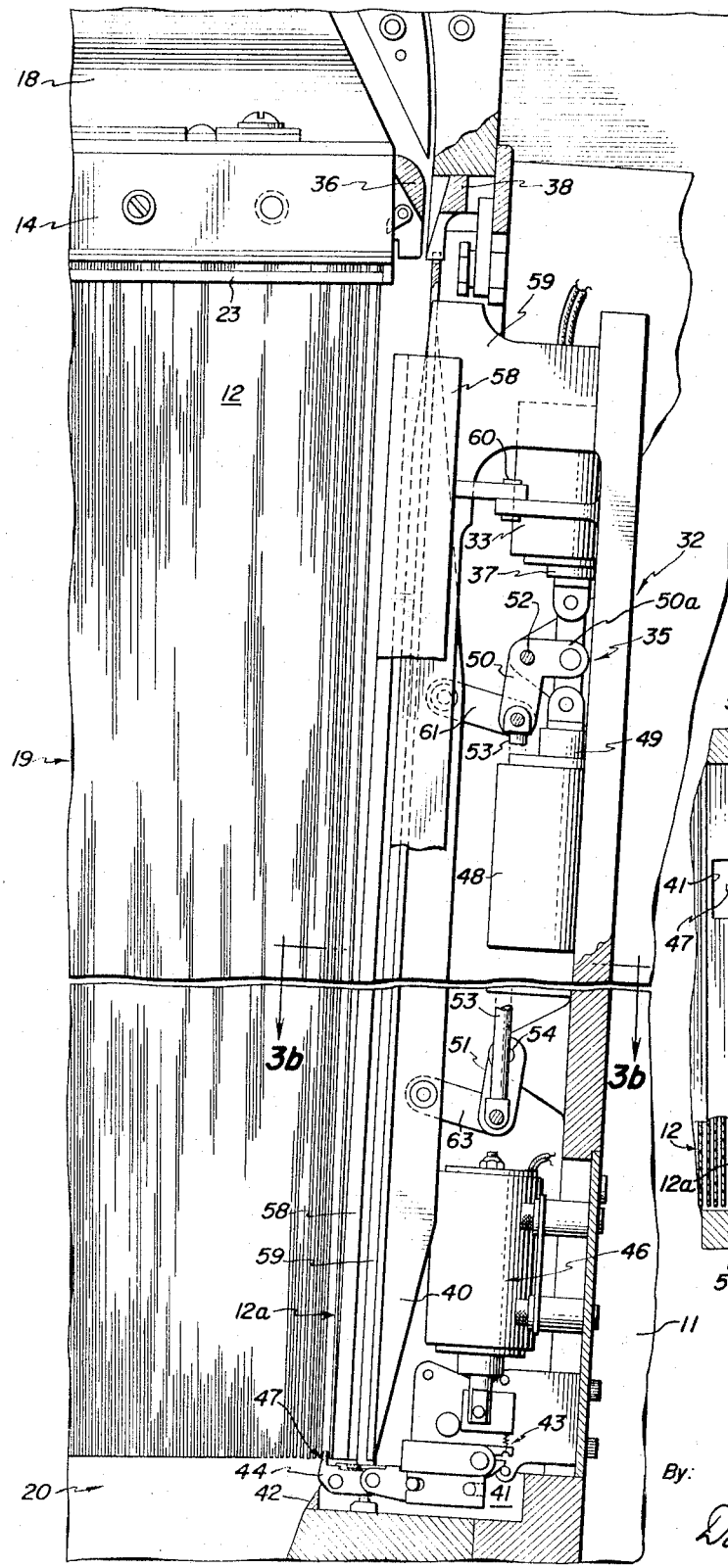
FIG. 3a is an enlarged elevation and partial section taken on line 3a—3a in FIG. 1 in the direction of the arrows showing how the loading means and retaining element may be provided in the random-access storage system of FIG. 1 in accordance with the invention.

Referring to FIG. 3a, there is shown a partial section and elevation of the magazine 19 which has been improved to include the present invention. The strip enters the loading means through a narrow slot formed between a strip detent support 36 and an extension member 38. After passing through the slot, the strip is propelled down between a retracted loader plate 40 and the group of strips 12. The loader plate 40 is shown in its retracted position because a solenoid 48 is de-energized and a solenoid 33 energized. The strip comes to rest when its lower edge contacts a striking plate 42, located at the bottom of the loading means.

Figure 3B:
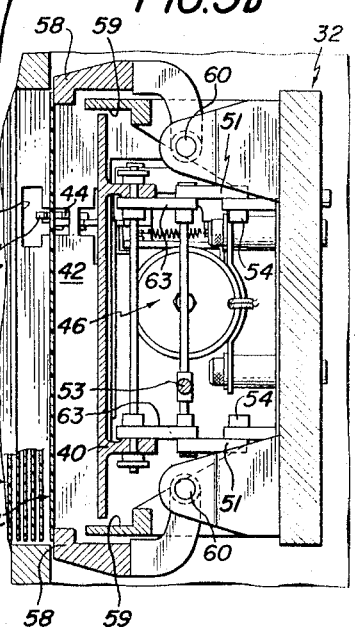
FIG. 3b is a sectional plan view taken on line 3b—3b in FIG. 3a in the direction of the arrows showing details of how the loading means may be incorporated in the random-access storage system of FIG. 1 in accordance with the invention.

After the strip is within the loading means 32, the loader plate 40 is ready to be moved in toward the group of strips 12 to reload the strip into the magazine. Inward motion to the loader plate 40 is provided by energizing solenoid 48 and de-energizing solenoid 33, because the solenoids 33 and 48 are linked to the loader plate 40 by suitable linkage means 35. The linkage means 35 includes a bell crank having two arms 50 and 50a fixed at right angles to each other with the outer end of arm 50a pin-connected to both armatures 37 and 49 of solenoids 33 and 48, respectively. In addition, the outer end of arm 50 is pin-connected by a link 61 to the back of the loader plate 40. When solenoid 48 is energized and solenoid 33 is de-energized, both arms 50 and 50a of the bell crank rotate clockwise about a pin 52, as viewed in FIG. 3a. A connecting rod 53 also pin-connected to the outer end of arm 50 supplies clockwise rotation to the outer end of a link 51 whose inner end pivots about a pin 54. The outer end of link 51 is also pin-connected by a link 63 to the back of the loader plate 40. The surface of the loader plate 40 moves parallelly in toward the group of strips 12. It should be noted that while the loader plate 40 is moving inwardly, two movable guide bars 58 pivot outwardly on pins 60 (see FIG. 3b) by solenoids and linkage (not shown). When the loader plate 40 is in the inward position, the movable guide bars 58 return to their original inward position. Conversely, when solenoid 33 is energized and solenoid 48 is de-energized, the arms 50 and 50a of the bell crank and the link 51 rotate counterclockwise and loader plate 40 is moved outwardly or retracted from the group of strips 12.

*Description of the retaining element*

In accordance with the present invention, a logically-controlled retaining element 44 (FIG. 3a) is provided so that, after any strip is loaded, the lower edge of the strip will lie between loader plate 40 and an upturned point 47 on retaining element 44. As a result, if the last-loaded strip should be selected for release by the system, it will not be able to fall, until the element 44 is dropped out of the way, even though free from the selector and gating rods. It will be understood, therefore, that any possibility of collision between a strip returning to the loading means and the strip nearest the loading means, when selected for release, is advantageously eliminated by causing solenoid 46 (FIG. 3a) (which controls the retaining element 44) to drop the retaining element 44 out of the way at the same time that the loading solenoid 48 is energized since, at such a time, the returning strip will already be in the loading means 32. It will also be understood that the retaining element only controls the dropping of the last-loaded strip and will not, therefore, interfere with the normal dropping of any other strips in the magazine.

When the solenoid 46 (FIG. 3a) is energized, linkage means 43 causes the point 47 of element 44 to drop and release the previously loaded strip, at the same time that the loader plate 40 is pushed inwardly. After the element 44 drops and while the solenoid 46 is still energized, the linkage means 43 causes the point 47 to retract and rise to engage the strip in the loading means 32. When the solenoid 46 is de-energized, the linkage means 43 causes the point 47 to move in toward the strips 12. It should be noted that, after a returning strip has entered the loading means 32, two strips are usually positioned between point 47 of element 44 and the loader plate 40. This condition is shown in FIG. 5 where the strip, that has just entered the loading means 32 (represented by strip 12b), is disposed between the retracted loader plate 40 and the previously loaded strip 12a. The strip 12b is spaced from the loader plate because the vertical edges of strip 12b are retained between the edges of movable guide bars 58 and stationary guide bars 59, disposed on each side of the loading means (more clearly shown in FIG. 3b). The mechanical linkage means 43, that links the solenoid 46 to the retaining element 44, makes allowances for the inherently wide tolerances found in the random-access system in order that the strip 12a is released and the strip 12b is engaged by the element 44 during the time strip 12b is loaded into the magazine 19.

Referring now to the enlarged pictorial view of FIG. 8, it will be understood that during the energizing portion of the retaining element cycle, the solenoid 46 is energized, and an armature 62 is pulled up into the solenoid. The armature 62, being pin-connected by a pin 64 to a plate 66, causes the plate 66 to pivot counterclockwise about another pin 68. The plate 66 is formed into a U-shape as shown. Pin 68, in turn, is fixed to a support member 70 that is fixedly bolted to the loading means 32. Plate 66 rotates against the action of a tension spring 72 stretched between pins 74 and 76 (shown in FIG. 4) that are fixed to plate 66 and support member 70, respectively. On plate 66 is mounted a slide 73 pin-connected at one end to the retaining element 44 by a pin 75. The slide 73 is disposed to slide with respect to the plate 66 along a line defined by pins 78 and 79 fixed to slide 73 and plate 66, respectively. The sliding motion between the slide 73 and the plate 66 will be described hereinafter.

Since the element 44 is able to pivot freely about pin 75, a latch 82 supports the element 44 so that it extends outwardly from the slide 73, substantially on the line defined by pins 78 and 79, as shown in FIGS. 4, 5 and 6. The latch 82 is pin-connected by a pin 84 to the plate 66. A tension spring 85 (FIG. 4), that is stretched between a pin 86 (FIG. 4) on the plate 66 and a lug 82a formed at the end of the latch 82, urges the latch 82 counterclockwise, as viewed in FIG. 4, into a notch 77 formed in slide 73. The function of the notch 77 will be explained hereinafter. The element 44 is supported by latch 82 with the aid of a pin 88 that is fixed to element 44 and that engages a U-shaped section 87 formed at the end of the latch 82 (as shown in FIG. 6). The pin 88 is free to move within the U-shaped section 87 whenever latch 82 is rotated upward with respect to the plate 66 about the pin 84.

During the energizing portion of the cycle, the element 44 is held extended, as shown, by the latch 82 until the point 47 on the element 44 is rotated by the plate 66 down into the cut-out 41 formed in the striking plate 42 (as shown in FIG. 6). The strip 12a is now released by the element 44, and strip 12b is being moved toward the group of strips 12. The total time lapse between the time solenoid 48 is energized and the time loader plate 40 moves from the retracted to the inward position is, for example, 30 milliseconds, and the total time lapse for element 44 to complete one cycle is, for example, 16 milliseconds. Therefore, when the element 44 is in the position shown in FIG. 6 near the end of the energizing portion of the cycle, which is about 8 milliseconds after the solenoids 46 and 48 have been first energized, the loader plate 40 has barely moved from its retracted position.

Before the element 44 returns to its quiescent position as shown in FIG. 4, the mechanical linkage means 43 causes the point 47 of the element 44 to retract and rise at the same time out of the cut-out 41 and above the striking plate 42. The point 47 of the element 44 retracts because the solenoid 46 causes the plate 66 to rotate, for example, one or two more degrees. This extra rotation causes the latch 82 to contact an anvil 90 fixed to the striking plate 42 through a lug 90a. The anvil 90 prevents the latch 82 from rotating with the plate 66. Since latch 82 is held stationary while the plate is rotating, the latch 82 causes the element 44 to rotate upward or counterclockwise (as viewed in FIG. 6) with respect to the slide 73 about the pin 75. The latch 82 no longer rests within the notch 77 in slide 73, and therefore a tension spring 92, that is stretched between the pins 78 and 79, causes the slide 73 to retract. In turn, the point 47 on element 44 is retracted from the group of strips 12 and rises. The linkage means 43 is now in the position as shown in FIG. 7. The total angular rotation about pin 68 for the plate 66, from the position shown in FIG. 4 to the position shown in FIG. 7, is, for example, twelve degrees. It should be noted in FIG. 7, that the strip 12a lies to the left of the point 47 of the element 44 while strip 12b still lies to the right.

After solenoid 46 is de-energized, spring 72 causes the plate 66 to rotate clockwise as viewed in FIG. 7. At the same time, the point 47 is made to move inwardly toward the group of strips 12 by the camming action, produced by a pin 94 acting against an inclined edge 95 (FIG. 7) formed on the slide 73. The pin 94 is fixed to support member 70. When the slide 73 is moved sufficiently toward the strips 12 by the camming action, the latch 82 falls into the notch 77 formed on the upper edge of slide 73 and prevents spring 92 from retracting the slide 73. The pin 88 follows the U-shaped section 87 on the latch 82, and the element 44 rotates counterclockwise (as viewed in FIG. 7) with respect to the slide 73 until element 44 is aligned with the slide 73. At the end of the loading cycle, the element 44 and the loader plate 40 are in the position as shown in FIG. 4. However, instead of strip 12a, strip 12b is engaged by the element.

*Automatic control of the retaining element*

As explained earlier, by controlling the retaining element 44 to prevent release of the strip nearest the loading means until after the next returning strip is in the loading means, any possibility of collision therebetween is eliminated. However, the operation of the retaining element 44 in this manner introduces a number of situations which must be appropriately handled for proper operation of the system.

One type of situation which must be accounted for is the situation occurring when the same strip is selected for release two times in a row. In such a case there will be no returning strip to initiate moving the retaining element 44 out of the way when the same strip is to be dropped the second time. To take care of this situation, the logic circuit means stores the address of the last-released strip and, when the system is free of moving strips (which is the same as when all the strips are loaded in the magazine), the logic circuit means energizes solenoid 46 to cause the retaining element 44 to drop out of the way and thereby allow the strip which is called for the second time in a row (and is thus now next to the loading means), to drop free to the capstan.

It will be appreciated that another situation is now presented as a result of the same strip having been called twice in a row. This is because, when the retaining element drops out of the way to let the same strip drop a second time, the next innermost strip in the magazine will now be nearest the loading means, but will not be engaged by the retaining element. Consequently, if this next strip happens to be the next strip to be dropped, the same strip, when it returns to the loading means, could collide with the dropping strip. The embodiment of the invention herein described in detail does not include another strip address register to store the address of this unengaged, adjacent strip, and therefore its address is not known. It is thus seen that to avoid interference of strips for this situation, another function of the logic circuit means is to delay the dropping of any strip until after the same strip is loaded into the magazine. The condition when the same strip is loaded is determined when the second flip-flop has been again set, indicating that the system is free of moving strips. However, before this second flip-flop is again set, the first flip-flop, that indicates the same strip has been dropped, is reset to prevent the retaining element 44 from releasing the last strip loaded into the magazine.

It should be noted that if the system should include another strip address register, then the address of the two previously dropped strips could be stored. With the use of two address registers, whenever the system were to make a strip selection, the newly received address would be compared with the addresses in both address registers. If the address of the newly selected strip should happen to be equal to the address of the last dropped strip, the first flip-flop would be set and the same strip would be again dropped in the manner described in the preceding paragraph. After the same strip drops, the system would then be ready to select another strip. However, now the system would compare the newly received address to the address stored within the other address register, which would contain the address of the strip now next to the loading means. If the addresses happen to be equal, the system would wait until after the same strip returns to the magazine before dropping the strip, and, if the addresses are not equal, the system would not wait for the same strip to return before dropping the strip. In the embodiment of the invention herein described in detail, the system includes only one address register which contains the address of the last dropped strip.

Figure 11:
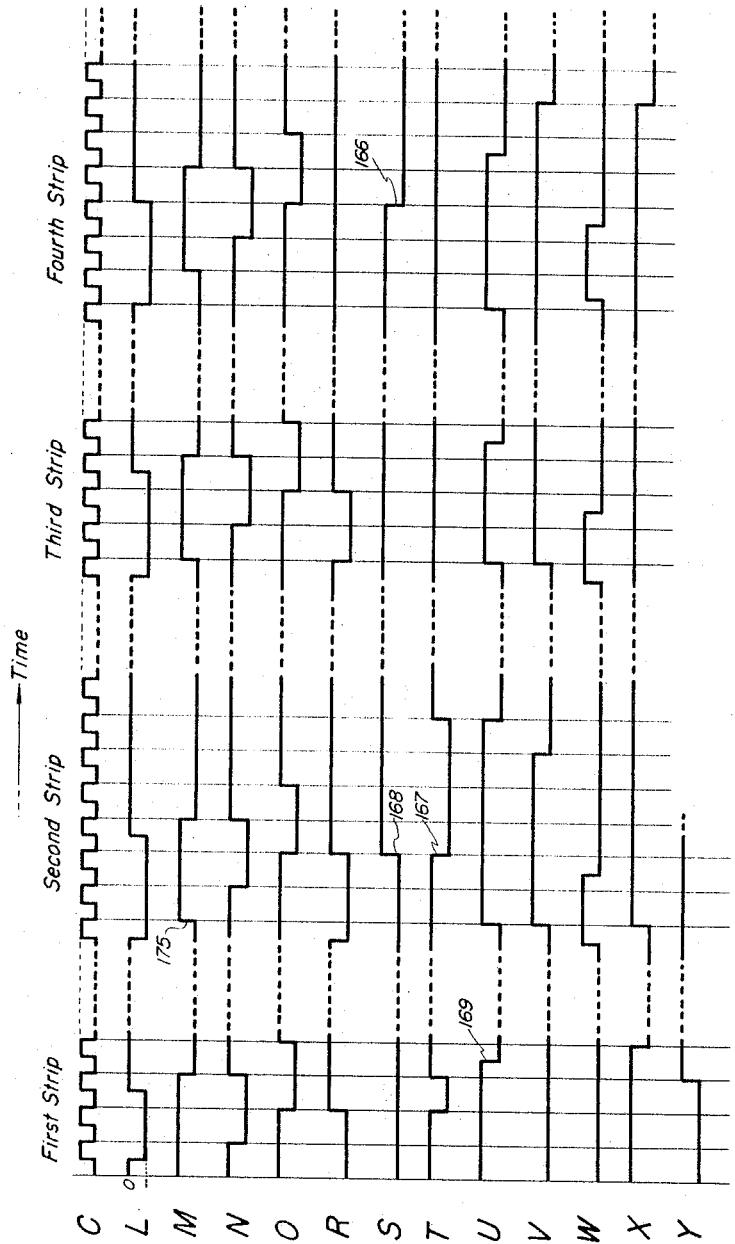
FIG. 11 is a plurality of graphs illustrating the states and time relationships of various pertinent signals in FIGS. 9 and 10 during an illustrative series of strip drops in a random-access system having the present invention incorporated therein.

Referring to FIGS. 9 and 10, there are shown schematic circuits that accomplish the above mentioned operation wherein only storage of the address of the last dropped strip is provided for. In the description of the schematic circuits, the flip-flops, marked F/F in the drawings, are similar to the flip-flop described in the United States patent application Serial No. 124,205, filed July 14, 1961, inventors Robert O. Gunderson et al., now Patent No. 3,132,260. FIG. 11 shows the various waveforms of some of the signals produced by the schematic circuits. Waveform C indicates clock signals that are repeated at a frequency of, for example, 100 kilocycles per second. These clock signals are produced by a suitable clock circuit 96 (FIG. 9). When the voltage level of a signal is negative, the signal is designated true and when the voltage level of a signal is zero or ground potential, the signal is designated as false. The output leads of the various circuit elements and the signals carried by the respective outputs have the same character designation.

Referring to FIG. 9, the following is a description of the automatic operation of the loading means 32 and the retaining element 44 during the time a strip is being loaded into the magazine. After a strip is released from the capstan, the strip enters the guideways 28 and 29 to be guided to the loading means 32. When the leading edge of a strip cuts off the light to the photocell 30, current through the photocell stops. The non-conducting state of the photocell is sensed by an amplifier 104 and, in turn, the voltage level on the amplifier's output lead A is at ground potential (which is defined above as false). When the photocell 30 is in the conducting state, the output lead A is at a negative potential (which is defined as true). It should be noted that the logic circuit maintains the loader plate 40 in the normal or inward position as long as the output lead A is at a negative potential or signal A, as produced by the amplifier, is true.

As mentioned in the preceding paragraph, when the returning strip in the guideway 29 interrupts the light to the photocell 30, signal A switches false. In turn, the loader plate 40 is retracted, i.e., pulled outwardly by the logic circuit, to receive the strip. This is accomplished in the following manner: the output of the amplifier 104 is coupled to an inverter 146 which produces a true signal A' when signal A is false. True signal A' passes through OR gate 106 to the input of a loader-plate flip-flop 114 which switches to the true state at the next true clock signal C. The state of the loader-plate flip-flop 114 determines whether the loader plate 40 is in the retracted (outward) position or the inward position. Since a strip is entering the loading means, the loader plate 40 has to be retracted to receive the strip. Therefore, when flip-flop 114 is true, the loader plate 40 is retracted. This result is accomplished by coupling signal D, from the true output of the flip-flop 114, to a solenoid-driver circuit 109 and signal D', from the false output, to a solenoid-driver circuit 108. The function of driver circuits 108 and 109 is to supply sufficient current to energize respective solenoids 48 and 33 when the respective input signal is true. Therefore, when flip-flop 114 is true, solenoid 33 is energized and solenoid 48 is de-energized and the loader plate 40 is retracted. However, when the trailing edge of the strip passes the photocell 30, signal A is again switched true, but the loader plate 40 is not ready to be moved to the inward position, as the strip has not fully entered the loading means. Loader-plate flip-flop 114 is held true because AND gate 107 passes a true signal to OR gate 106 for a given interval of time to allow the strip to enter the loading means. The given interval of time is timed by a loader-plate one-shot 105, because the loader-plate one-shot 105 has been switched to the true state when signal A has switched true. After the given interval of time, the one-shot 105 switches back to the false state and signal B' becomes true. In turn, a strip-receive one-shot 129 switches to the true state to indicate that the strip is now fully within the loading means. The true output Z of the strip-receive one-shot 129, being coupled with signal D to an AND gate 111, causes a true signal to pass to OR gate 163 since signal D is also true. Now, latch flip-flop 110 has a true signal coupled to its input, so that the latch flip-flop 110 switches true, making signal F' false. The loader-plate flip-flop 114 is unlatched or switched to the false state. The function of the latch flip-flop 110 has been to hold the loader-plate flip-flop 114 true until the strip enters the loading means. The latch flip-flop 110 is held in the true state by the logical product formed by signals F and Z at AND gate 162, until the strip-receive one-shot 129 switches false. It will be shown that when the one-shot 129 switches false, the loader plate 40 is in the full inward position and the strip is fully loaded.

When the loader-plate flip-flop 114 has been switched to the false state, solenoid 48 is energized and solenoid 33 is de-energized, and the loader plate is moved to the inward position. As a result of signal D' being switched true, a one-shot 120 (that controls the retaining element 44) is switched to the true state by signal D' via OR gate 112. True signal E then produced by the one-shot 120, causes a solenoid-driver circuit 113 to energize solenoid 46 for a given length of time, for example, 8 milliseconds, and afterwards solenoid 46 is de-energized. As mentioned above, solenoid 48 is held in the energized state by true signal D', and in turn, the loader plate 40 is held in the inward position as long as signal A is true, because the loader-plate flip-flop 114 cannot switch to the true state until signal A is again switched false by a returning strip in the guideway 29.

The following is a description of how a strip is selected and dropped. As mentioned above, when the computer, such as a computer 115, requires the random-access system to drop a strip, the logic circuit means of the random-access system indicates if a selected strip is the same strip as dropped immediately before and if the dropping of a selected strip is to be delayed. The computer supplies to the random-access system a plurality of signals to command the random-access system to drop a particular strip. These signals are, for example, call-strip signal L and strip address signals $P_1$ to $P_8$. Signals $P_1$ to $P_8$ may be either true or false at the same time representing binary bits and the address of one of the 256 strips. Signals $P_1$ to $P_8$ are fed in parallel through eight leads while signal L is fed by a separate lead. When signal L is true, signals $P_1$ to $P_8$ indicate a particular address. The signals L, and $P_1$ to $P_8$, together with the clock signal C and two other signals G and W (that will be described hereinafter) are supplied to a strip release and logic circuit 116. Circuit 116 has eight output leads, $H_1$ to $H_8$, and an output lead U, that are coupled to a strip release mechanism 117. The strip release mechanism 117 includes the solenoid means 16, mentioned above.

Referring to FIG. 10, the strip release and logic circuit 116 is shown schematically and in more detail. The circuit 116, together with a no-strip flip-flop 101 (FIG. 9), determines when the same strip is being called and when to delay the dropping of a strip so as not to cause a strip collision within the loading means. Since an overall description of the circuit has been given, the following, being a detailed description begins when a new group of strips 12 is placed within the magazine 19, and the magazine is closed. Initially, the strip next to the loading means is not engaged by the retaining element 44. Therefore, the first strip dropped can be any strip in the magazine, and the retaining element does not interfere with the selection and dropping of the first strip. However, if the second strip to be dropped happens to be the strip next to the loading means (not engaged by the retaining means), the first strip when it returns may collide wtih the dropping strip. It is thus seen that to avoid interference of strips for this situation another function of the logic circuit means is to delay the dropping of any strip until after the first strip is loaded into the magazine. This is accomplished by the logic circuit means in the following manner: At the time when the magazine 19 is closed, a microswitch 97 (FIG. 9) is temporarily closed placing a negative potential on a lead G and therefore producing the above mentioned true signal G. The true signal G is coupled to both OR gates 118 and 121 (FIG. 10) whose outputs are respectively coupled to the inputs of a start flip-flop 127 and a same-strip flip-flop 128 which are switched true to indicate an initial or starting condition wherein no strip is engaged by the retaining element 44. Start flip-flop 127 being true produces a true signal Y that is coupled with a signal O' to AND gate 119 to hold start flip-flop 127 true as long as signal O' is true. The same-strip flip-flop 128 being true produces a true signal S that is coupled with signal O to AND gate 133 and with signal N' to AND gate 134. The same-strip flip-flop is held true as long as signal N' is true. It will be seen that when the system is in starting condition, both signals O' and N' are true, and also a signal M' is true to allow the computer 115 to feed information to the system.

The random-access system is now ready to be operated remotely by the computer. Since, as mentioned above, signal M' and signal O' are both true, a call-strip signal L when true is able to pass through AND gate 122 to the input of a select-strip flip-flop 148 to switch the flip-flop to the true state at the next true clock signal C. When the select-strip flip-flop 148 is true, signal N is true to indicate that the system is ready to receive the address of a strip and select the strip out of the group of strips 12. The address of a strip is stored in an address register having eight stages $130a$ to $130h$, with one stage storing one bit. As an example, one bit of the address is stored in stage $130a$ in the following manner: the true signal N, from the true output of select-strip flip-flop 148, and signal $P_1$ are coupled to AND gate 126 in stage $130a$. If signal $P_1$ is true indicating a "0" bit, AND gate 126 passes a true signal to OR gate 154, and a strip-number-storage flip-flop 152 is switched to the true state or remains in the true state. If signal $P_1$ is false indicating a "1" bit, and GATE 126 does not pass a true signal to OR gate 154, and the strip-number-storage flip-flop 152 is switched to the false state or remains in the false state. It will become apparent that the strip-number-storage flip-flop 152 maintains its state until another strip is selected, because its true output lead $Q_1$ is coupled to an AND gate 153 together wtih the false output lead of select-strip flip-flop 148.

After the address of a strip is stored in stages $130a$ to $130h$, the selector rods 17 are set to match the address in the following manner: For example, the false output $Q_1'$ from the strip-number-storage flip-flop 152 is coupled to a selector-rod solenoid driver 131, which is similar to solenoid drivers 108 and 109. Therefore, when signal $Q_1'$ is false, as in the case when signal $P_1$ is true, the driver 131 does not couple a current on lead $H_1$ of sufficient magnitude to energize one of the solenoids, and the respective selector rod 17 (FIG. 2) remains in the "0" state. However, if strip-number-storage flip-flop 152 is not switched true because signal $P_1$ is true, the signal $Q_1'$ is true, and the driver 131 does couple a current on lead $H_1$ and a respective selector rod 17 is actuated to the "1" state.

At the same clock time that the eight strip-number-storage flip-flops in stages $130a$ to $130h$ are being set to store the address of the selected strip, a strip-number-receive flip-flop 149 is switched to the true state by true signal N to indicate that the system has received the address of the selected strip. Since the system has received the address of the first strip, at the next true clock signal, the select-strip flip-flop 148 is switched false by false signal O' closing AND gate 122. Therefore, any spurious noise signals on leads $P_1$ to $P_8$ do not affect the states of the eight strip-number-storage flip-flops in stages $130a$ to $130h$.

It should be noted that both signals N' and O are false during the same clock period. Therefore, neither AND gate 133 nor AND gate 134 passes a true signal during this clock period. Since this is the first strip selected and the system is in starting position, AND gate 135 passes a true signal to maintain the same-strip flip-flop 128 in the true state. As will become apparent hereinafter, everytime the same-strip flip-flop 128 is set true after a strip is dropped, the retaining element 44 does not engage a strip. Since no strip is engaged by the retaining element at the starting position, start flip-flop insures that the same-strip flip-flop 128 is set true after the first strip is dropped. During the selection of succeeding strips, the start flip-flop 127 serves no useful purpose. Therefore, when signal O' has been switched false, start flip-flop 127 is switched false and is not switched true again until the magazine is again opened and then closed.

However, before the selected strip is able to drop out of the magazine 19, a side-gating-rod solenoid driver 139 should have a true signal coupled to its input by AND gate 132. Side-gating-rod solenoid driver 139 supplies sufficient current on lead U when its input is true to energize two solenoids (not shown) in strip release mechanism 117, which solenoids actuate the two side gating rods 23 and release the selected strip. AND gate 132 supplies a true signal to the input of driver 139 when the logical product, formed by signals K', M, and T', is true.

The time when the first strip is to be dropped or when the logical product (signals K', M, and T') is to be true is determined by a gating-delay one-shot 157. When the signals N and O are both true, a true signal passes through AND gate 144 and switches the gating-delay one-shot 157 to the true state. The one-shot 157 allows sufficient time, for example 15 microseconds, for the selector rods 17 to rearrange themselves to the address of the selected strip before switching false, making signal K' true. By this time both signals M and T' are true, because as shown in FIG. 11, they have been switched true 5 microseconds before signal K' is switched true. AND gate 132 passes a true signal to the input of driver 139, which feeds a current to lead U (shown by a falling vertical line 169 in waveform U, FIG. 11). Because the time setting on the one-shot 157 happens to be 15 microseconds, vertical line 169 is formed in the middle of a 10 microsecond clock period.

After a few milliseconds (represented by the dash lines in FIG. 11), the first dropped strip reaches the transducer 24 (FIG. 9) and cuts off the light from a lamp 93 to a photocell 98. Photocell 98, being similar to photocell 30, has its output coupled to an amplifier 100 and the above mentioned signal W is switched false when the light is shaded from the photocell 98 by the strip. Since the computer 115 automatically produces a true signal I to open the gate means 26 after a strip is selected, the signal I' is also false. Neither AND gate 124 nor 125 (FIG. 10) passes a true signal, and busy flip-flop 151 is switched to the false state as illustrated by rising vertical line 175 in waveform M (FIG. 11).

Since the random-access system is not busy, the computer again is able to supply another true call-strip signal L to AND gate 122 and address signals $P_1$ to $P_8$ for the second strip to the respective eight stages $130a$ to $130h$ of the address register. Signals M' and O' are both true, and AND gate 122 passes a true signal to switch select-strip flip-flop 148 to the true state. Everytime a strip selection is to be made, a comparison between the first strip address and the second strip address is being made by the logic circuit. A comparison between strip addresses is accomplished by coupling each of the eight signals $P_1$ to $P_8$ to one of the eight AND gates $170a$ to $170h$. Also the eight signals $Q_1'$ to $Q_8'$ are each coupled to the eight AND gates $170a$ to $170h$, respectively. The inverses of each signal $P_1$ to $P_8$, signals $P_1'$ to $P_8'$, are each coupled to eight AND gates $171a$ to $171h$, respectively, and signals $Q_1$ to $Q_8$ also are each coupled to the eight AND gates $171a$ to $171h$, respectively. The outputs of the sixteen AND gates $170a$ to $170h$ and $171a$ to $171h$ are coupled to an OR gate 172 whose output is coupled to a strip-comparison double-driver 102. When the set of incoming signals $P_1$ to $P_8$ is equal to the set of storage signals $Q_1$ to $Q_8$, none of the sixteen AND gates pass a true signal, and the strip-comparison double-driver 102 is switched to the false state. When the two sets of signals are not equal, at least one of the sixteen AND gates passes a true signal to switch the double-driver 102 to the true state.

The following description explains the operation of the logic circuit when the address of the second strip is not equal to the address of the first strip, remembering that the strip next to the loading means is not engaged by the retaining element 44. At the beginning of the selection of the second strip, the same-strip flip-flop 128 is being held in the true state by AND gate 134. As mentioned above, when no strip is engaged by the retaining element 44, the following strip has to be delayed from dropping until the system is free of moving strips. When signals S, O' and N are true during the same clock period, AND gate 137 passes a true signal to OR gate 140 to switch a side-gating-rod flip-flop 156 to the true state (shown by a falling vertical line 167 in waveform T, FIG. 11). At the same clock time, because the addresses of the first and second strips do not compare, the same-strip flip-flop is able to switch to the false state for reasons that will become apparent hereinafter (shown by a rising vertical line 163 in waveform S, FIG. 11). At the next true clock signal, AND gate 138 is able to pass a true signal to OR gate 140 to hold the side-gating-rod flip-flop 156 in the true state, because signal V' is also true indicating that the first strip has not yet been loaded. Now when the time on the gating-delay one-shot 157 runs out, the strip is inhibited from dropping because side-gating-rod flip-flop 156 is true, making signal T' false. Signal T' becomes true only after the first strip is loaded in the magazine 19. This condition is determined when the no-strip flip-flop 101 (FIG. 9) is switched true making signal V' false. Since the no-strip flip-flop 101 indicates whether a strip is moving or not moving in the system, the logic applied to the input of the no-strip flip-flop 101 happens to switch the flip-flop true only when none of the strips are moving in the system.

In order to indicate no moving strips, the conditions that should occur at the same time are that the strip-release gate 26 is open, the loader plate 40 is in the full inward position, and the photocell 98 has light continuously shining on it.

As mentioned above, the strip release gate 26 is open when signal I is true, and Signals D' and F' are both true when the loader plate 40 is in the full inward position. However, continuously shining light on the photocell 98 in the transducer 24 is determined when signal W is still true after the time set in a no-strip one-shot 159 runs out while the release gate is open, thus insuring that any strip, which may be on the capstan, is removed from the capstan and is on its way to the loading means. Therefore, both signals W and I are fed to AND gate 145 which feeds a true signal to the no-strip one-shot 159, when both signals W and I are true. The one-shot 159 switches to the true state and, after a given time, if no strip is on the capstan, switches to the false state. The false output J' of the one-shot 159 is coupled to the AND gate 147. Signals I, W, D' and F' are also coupled to AND gate 147, and when all are true, indicating the first strip has returned to the magazine, AND gate 147 feeds a true signal to the no-strip flip-flop 101 to switch it to the true state. Signal V' is now false and AND gate 138 (FIG. 10) cannot pass a true signal. In turn, at the next clock period the side-gating-rod flip-flop 156 is switched to the false state. Signal T', being true, opens AND gate 132 and the second strip drops. Since the same-strip flip-flop 128 has been switched false making signal S false before the no-strip flip-flop has switched true, an AND gate 158 (FIG. 9) cannot pass a true signal X to OR gate 112, thus, insuring that the first strip is engaged by the retaining element 44.

It should be noted that during the selection of the second strip, the opening of the side-gating rods 23 has been delayed until the system is free of moving strips. This procedure is necessary because the retaining element does not engage a strip, and the system does not know which strip is located next to the loading means. The second strip selected, since it is not the same as the first strip, may be the strip next to the loading means. However, it will be explained hereinafter that if the second strip selected is the same as the first, side-gating-rod flip-flop 156 switches back to the false state before the gating-delay one-shot 157. Then the first strip is dropped after it is loaded and as soon as the no-strip flip-flop 101 switches true, because AND gate 153 passes a true signal X to actuate the retaining element 44.

Again after a few milliseconds delay, the second strip also cuts off the light to photocell 98 and signal W switches false (at the same time signal I' is false) to switch busy flip-flop 151 to the false state. The random-access system is ready to drop a third strip. Now that a strip is engaged by the hook, the logic circuit means does not cause the system to wait for the previous (second) strip to return to the magazine before opening the side-gating-rods 23. If the third strip is the strip engaged by the retaining element, and if the third strip is not the same strip dropped immediately before, the third strip drops as soon as the second strip is loaded because as mentioned above the retaining elements release the strip when another strip is loaded. If the third strip is not the strip engaged by the retaining element, the third strip could be dropped before the second strip is loaded, if the computer happens to call for the strip as soon as signal M' is switched true. This result happens because the same-strip flip-flop 128 and gating-rod flip-flop 156 remain false. Therefore, solenoid driver 139 couples a current to lead U as soon as the gating-delay one-shot 157 switches back to the false state. The random-access system now is operating in a fast mode because there is no waiting for the no-strip flip-flop 101 to switch to the true state before the gating rods 23 are open or for AND gate 158 to pass a true signal to energize solenoid 46 to release a strip. The system operates in the fast mode as long as the same strip is not selected two times in a row.

However, there is a time when the computer calls for the same strip that was dropped immediately before, i.e., the same strip is selected two times in a row. The timing diagram of FIG. 11 refers to this strip as the "Fourth Strip." When the fourth or same strip is being dropped, the circuit 117 operates in the following manner: The computer again feeds a true call-strip signal L to AND gate 122, and at the same time the signals $P_1$ to $P_8$ and their inverses $P_1'$ to $P_8'$ are also fed to respective AND gates 170a to 170h and 171a to 171h. The address of the fourth strip is now assumed to be the same as the third strip, and the strip-comparison double-driver is in the false state during the time when both signals N and O' are true. Signals N, O' and R' are coupled to AND gate 136 which is able to pass a true signal to OR gate 121, and the same-strip flip-flop 128 switches to the true state (indicated by a falling vertical line 166 in waveform S, FIG. 11). Similar to the selection of the first strip, the same-strip flip-flop 128 is held true first by AND gate 133 and then by AND gate 134. Since the same-strip flip-flop 128 has switched true when both signals N and O' are true, AND gate 137 does pass a true signal and the side-gating-rod flip-flop 152 remains in the false state. Since the side-gating-rod flip-flop 152 remains in the false state, side-gating-rod solenoid driver 139 couples a current to lead U as soon as the time on the gating-delay one-shot 157 runs out. Eventually, the same strip is loaded back into the magazine, but the strip is prevented from dropping because it is held by the retaining element 44.

In order not to hamper the operation of the system, the element 44 is made to release the same strip in the following manner: The latch flip-flop 110 (FIG. 9) switches to the false state after the time on strip-receive one-shot 129 runs out, which time is set to about 35 milliseconds after signal D' is switched true, to indicate that the strip is fully loaded into the magazine. When true signals F' is formed, the no-strip flip-flop 101 switches to the true state. Since busy signal M and same-strip signal S are also true, AND gate 158 passes a true signal X to OR gate 112 to actuate the element 44. The element 44 releases the fourth strip which is the same strip dropped before, and since the side gating rods 23 are being held open, the fourth strip drops.

It should be noted that signal X was produced also when the first strip was selected and, in turn, the element 44 was actuated. Since there was no strip engaged by element 44, this step did not affect the dropping of the first strip.

After the fourth or same strip is released, the strip next to the loading means is not engaged by the element 44. As mentioned before, when no strip is retained by the element, the same-strip flip-flop 128 is set true and the system waits to be free of moving strips before dropping the next or fifth strip. The logic circuit means functions in the same manner as when the second strip was dropped, and the waveforms for various signals during the selection and dropping of the fifth strip are the same as for the second strip, shown in FIG. 11, only if the fourth and fifth strips are not the same. If the fourth and fifth strips happen to be the same strip, the same-strip flip-flop 128 is held true, and the circuit functions in a manner similar to when the fourth strip was dropped, and the waveforms for the various signals during the selection of the fifth strip would be the same as for the fourth strip. The waveforms of the various signals during the selection and dropping of a following or sixth strip would be the same as for the third strip, if the fourth, fifth, or sixth strips were all different strips.

As mentioned above, if when the computer has called for the second strip, the second strip happens to be the same as the first strip, the waveforms, shown in FIG. 11 for the fourth strip, would follow after the first strip. However, for such an operation waveform S would have been held true during the selection. Thus the improved random-access system prevents a collision of strips within the loading means, no matter in what order the strips are selected to drop.

Various other embodiments and variations of the present invention are contemplated and will become apparent to those skilled in the art without departing from the spirit and scope of the invention. Therefore, the invention is not limited to the exemplary apparatus and procedures described, but includes all embodiments within the scope of the claims.

What is claimed is:

1. In a random-access storage system, a plurality of individual data-storage elements retained in an assembled group each having unique coding means thereon, selecting and releasing means cooperating with the coding means on said elements to permit any selected one of said elements to be released for movement with respect to the other elements in said group regardless of the position of the selected element in the group, and position-sensitive release control means operative independently of said selecting and releasing means for exerting further control on the release of an element from said group after selection and release by said selecting and releasing means when the selected element is in a predetermined position in said group different from other positions in said group.

2. In a random-access storage system, a plurality of individual data-storage elemets retained in an assembled group each having unique coding means thereon, selecting and releasing means cooperating with the coding means on said elements to permit any selected one of said elements to be released for movement with respect to the other elements in said group regardless of the position of the selected element in the group, transducing means, means for causing an element released by said selecting and releasing means to be separated from said group and applied to said transducing means, means for causing a separated element to automatically be returned to said assembled group, and means operative independently of said selecting and releasing means for selectively delaying the release of a selected element from said assembled group when the selected element is in a predetermined position in said group which would interfere with the return of an element to said assembled group.

3. In a random-access storage system, a plurality of individual data-storage strips retained in an assembled group each having unique coding means thereon, selecting and releasing means cooperating with the coding means on said strips to permit any selected one of said strips to be released for movement with respect to the other elements in said group regardless of the position of the selected strip in the group, transducing means, means for causing a strip released by said selecting and releasing means to be separated from said group and applied to said transducing means, returning means for returning a separated strip back to the vicinity of said assembled group by a path different from the path taken by a strip in separating from said group, loading means operative independently of said selecting and releasing means for receiving a strip from said returning means and automatically loading a returned strip back into said assembled group in a manner so that a previously selected strip can be loaded at the same time that a new strip is being selected and released, and control means operative independently of said selecting and releasing means for selectively controlling the separation of a selected strip from said group after selection by said selecting and releasing means whenever the selected strip is in a position in said group which could interfere with a strip returning to said loading means.

4. The invention in accordance with claim 3, wherein said control means includes a selectively actuable pivotable retaining element capable of preventing separation of the last-loaded strip when in a first position and permitting separation of the last-loaded strip when in a second position.

5. The invention in accordance with claim 4, wherein the operation of said retaining element is controlled in a manner so as to prevent separation of the last-loaded strip until the return of a previous strip to said loading means.

6. The invention in accordance with claim 5, wherein said retaining element is additionally controlled so as to automatically permit separation of the last-loaded strip in the event the last-loaded strip is selected and released by said selecting and releasing means when there is no returning strip in the system to initiate operation of said retaining element.

7. The invention in accordance with claim 6, wherein said selecting and releasing means is inhibited from releasing a new strip whenever there is no strip in said assembled group which is in a position to cooperate with said retaining element.

8. An improved strip random-access system comprising: magazine means for supporting a group of strips and including means for selectively dropping any one of the strips, loading means for reloading a strip back into said magazine means, guideway means for receiving a strip after being dropped from said magazine means and for guiding the dropped strip into said loading means, a retaining element disposed near said loading means for engaging a strip upon being reloaded into said magazine means and preventing it from dropping even though it is next selected to be dropped from said magazine means, and means controlling said retaining element for releasing the strip engaged thereby to enable it to be selectively dropped from the magazine as another strip is loaded back into the loading means and thereafter engaged by said retaining element.

9. An improved strip random-access system comprising: magazine means for supporting a group of strips and including means for selectively dropping any one of the strips regardless of its position in the group, loading means for reloading a strip back into said magazine means, guideway means for receiving a strip after being dropped from said magazine means and for guiding the dropped strip into said loading means, detecting means for indicating when a strip is located in said guideway means, a retaining element disposed near said loading means for engaging a strip after it is reloaded into said magazine means, actuating means for actuating said element to release an engaged strip, and means for causing said actuating means to actuate said element whenever a strip is being reloaded and whenever said magazine means selects to drop a strip which is the same strip dropped immediately before.

10. An improved strip random-access system comprising: magazine means for supporting a group of strips and for selectively dropping any one of the strips, loading means for reloading a strip back into said magazine means, guideway means for receiving a strip after being dropped from said magazine means and for guiding the dropped strip into said loading means, detecting means disposed in said guideway means for indicating when a strip is located in said guideway means, a retaining element disposed near the bottom of said loading means for engaging a strip after it is reloaded, a solenoid means including a solenoid to actuate said element so that said element releases the strip engaged by said element, first logic circuit means for energizing and de-energizing said solenoid whenever a strip is being loaded back into said magazine means by said loading means, second logic circuit means for producing a signal in response to said detecting means when said detecting means indicates that no strip is located in said guideway means, third logic circuit means for energizing and de-energizing said solenoid whenever said signal is produced and said magazine means selects to re-drop a strip which is the same strip dropped immediately before to cause the same strip to drop again after it has been reloaded into said magazine means, and fourth logic circuit means for inhibiting said magazine means from dropping another strip, after said third logic circuit means causes the same strip to be dropped, until said signal is again produced by said second logic circuit means.

11. An improved strip random-access system comprising: magazine means for supporting a group of strips in a depending position and for selectively dropping any one of said strips, loading means disposed at one end of said magazine means for reloading a strip back into said magazine, guideway means for receiving a strip after being dropped from said magazine means and for guiding the dropped strip into the top of said loading means, detecting means for indicating when a strip is located in said guideway means, retaining means comprising: a reatining element disposed at the bottom of said loading means for engaging the lower end of a strip after it is reloaded into said magazine means, actuating means for actuating said element to cause said element to drop down and release an engaged strip, and logic circuit means responsive to said detecting means for causing said actuating means to actuate said element and release the strip engaged by said element, said logic circuit means including: a register for storing the address of the last dropped strip, a comparison circuit for comparing the address of a strip to be dropped to the address stored within said register, a first flip-flop disposed to be set by said comparison circuit when said comparison circuit indicates that said addresses are equal, and a second flip-flop disposed to be set when said detecting means indicates that no strip is to be located in said guideway means, said first and second flip-flops being disposed to cause said actuating means to actuate said element whenever both flip-flops are set, and said magazine means selects to drop a strip to cause the strip engaged by said element to drop from said magazine means, and then preventing said magazine means from dropping a following strip until said second flip-flop is again set.

12. An improved strip random-access system comprising: magazine means for supporting a group of strips in a depending position and for selectively dropping any one of said strips, loading means disposed at one end of said magazine means for reloading a strip into said magazine, guideway means for receiving a strip after being dropped from said magazine means and for guiding the dropped strip into the top of said loading means, detecting means disposed in said guideway means for indicating when a strip is located in said guideway means, retaining means comprising: a retaining element disposed at the bottom of said loading means for engaging a strip after it is reloaded into said magazine means, actuating means for actuating said element to cause said element to release an engaged strip, logic circuit means including: a first flip-flop responsive to said detecting means for causing said loading means to load a strip after it has entered the loading means and for actuating said actuating means to cause said element to release a previously loaded strip and engage the newly loaded strip, a register for storing the address of the last dropped strip, a comparison circuit for comparing the address of a strip to be dropped to the address stored within said register, a second flip-flop disposed to be set by said comparison circuit when said comparison circuit indicates that said addresses are equal, a third flip-flop disposed to be set when said detecting means indicates that no strip is located in said guideway means, said second and third flip-flops being disposed to actuate said actuating means and said element whenever both said second and third flip-flops are set, and said magazine means selects to drop a strip, to cause the strip engaged by said element to drop from said magazine means, and then preventing said magazine means from dropping a following strip until said third flip-flop is again set.

13. An improved strip random-access system comprising: magazine means for supporting a group of strips and for selectively dropping any one of the strips, loading means for reloading a strip back into said magazine means, guideway means for receiving a strip after being dropped from said magazine means and for guiding the dropped strip into said loading means, detecting means for indicating when a strip is located in said guideway means, a retaining element disposed at the bottom of said loading means for engaging a strip after it is reloaded into said magazine means, and means for causing said element to release the engaged strip and engage another strip being loaded back into said magazine means.

14. An improved strip random-access system comprising: magazine means for supporting a group of strips and for selectively dropping any one of the strips, loading means for reloading a strip back into said magazine means, guideway means for receiving a strip after being dropped from said magazine means and for guiding the dropped strip into said loading means, detecting means for indicating when a strip is located in said guideway means, a retaining element disposed at the bottom of said loading means for engaging a strip after it is reloaded into said magazine means, a solenoid having an armature, and mechanical linkage means connecting said element to said armature, said mechanical linkage means including: a plate disposed to rotate about a fixed axis, and being pin-connected to said armature to be rotated and then returned to its original position by said armature, a slide slidably engaging said plate, and having said element hinged to the outer end thereof, a latch pin-connected to said plate and engaging said element for holding said element so that the relative position of said element with said slide is controlled, an anvil fixed with respect to said magazine means and disposed to contact said latch as said solenoid rotates said plate from its original position to cause said latch to rotate with respect to said plate and, in turn, to cause said element to rotate with respect to said slide, a spring acting between said plate and said slide for causing said slide to slide with respect to said plate after said anvil contacts said latch and in turn said element is pulled away from said group of strips, camming means for causing said slide to return to its original position when said solenoid causes said plate to rotate back to its original position, and in turn said latch and said element are returned to their original position.

15. An improved strip random-access system comprising: magazine means for supporting a group of strips and for selectively dropping any one of the strips, loading means for reloading a strip back into said magazine means, guideway means for receiving a strip after being dropped from said magazine and for guiding the dropped strip into said loading means, detecting means for indicating when a strip is located in said guideway means, logic circuit means for controlling the selection and dropping of a strip, said logic circuit means including a register for storing the address of a strip, a comparison circuit for indicating when the address of a strip to be dropped is the same as the strip's address stored in said register, circuit means in response to said detecting means and said comparison circuit for controlling said magazine means so that each strip is selected and controllably dropped one at a time, and delaying the dropping of a strip in response to said comparison circuit until all the strips are loaded within said magazine.

No references cited.

ROBERT C. BAILEY, *Primary Examiner.*

G. D. SHAW, *Assistant Examiner.*